(12) United States Patent
Nagano et al.

(10) Patent No.: US 6,262,837 B1
(45) Date of Patent: Jul. 17, 2001

(54) FLUORESCENT MICROSCOPE

(75) Inventors: Takashi Nagano, Tokyo; Atsuhiro Tsuchiya, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/401,204

(22) Filed: Sep. 22, 1999

(30) Foreign Application Priority Data

Sep. 24, 1998 (JP) .................................................. 10-269560

(51) Int. Cl.⁷ .................................................. G02B 21/00
(52) U.S. Cl. .......................... 359/368; 359/389; 359/385; 359/390
(58) Field of Search .................................. 359/368–390, 359/885, 385, 891; 250/458.1; 356/344, 317, 417

(56) References Cited

U.S. PATENT DOCUMENTS

| | | | |
|---|---|---|---|
| 5,307,148 | * 4/1994 | Kambara et al. | 356/344 |
| 5,371,624 | 12/1994 | Nagano et al. | 359/389 |
| 5,689,317 | 11/1997 | Miller . | |
| 5,710,663 | * 1/1998 | Kawasaki | 359/389 |
| 5,814,820 | * 9/1998 | Dong et al. | 250/458.1 |
| 5,880,473 | * 3/1999 | Ginestet | 250/458.1 |

FOREIGN PATENT DOCUMENTS 2749069    2/1998   (JP) .

* cited by examiner

Primary Examiner—Mohammad Sikder
(74) Attorney, Agent, or Firm—Frishauf, Holtz, Goodman Langer & Chick, P.C.

(57) ABSTRACT

A fluorescent microscope to observe a specimen dyed with a plurality of fluorescent dyes comprises a first filter which selectively transmitting light from a light source, a dichroic mirror which leads an light transmitting the first filter to the specimen and transmits fluorescence from the specimen, a second filter which selectively transmitting fluorescence from the specimen, a changing section to change at least one transmitting wavelength bands of the first filter and the second filter, a detection section to detect the wavelength selected by the changing section, an imaging element which images an image of the specimen, and an identification section to identify a kind and the position of the fluorescent dyes with which the specimen is dyed based on a wavelength data obtained from the detection section before and after a change in the transmitting wavelength band by the wavelength change section and a change in the image according to a change in the transmitting wavelength band.

20 Claims, 13 Drawing Sheets

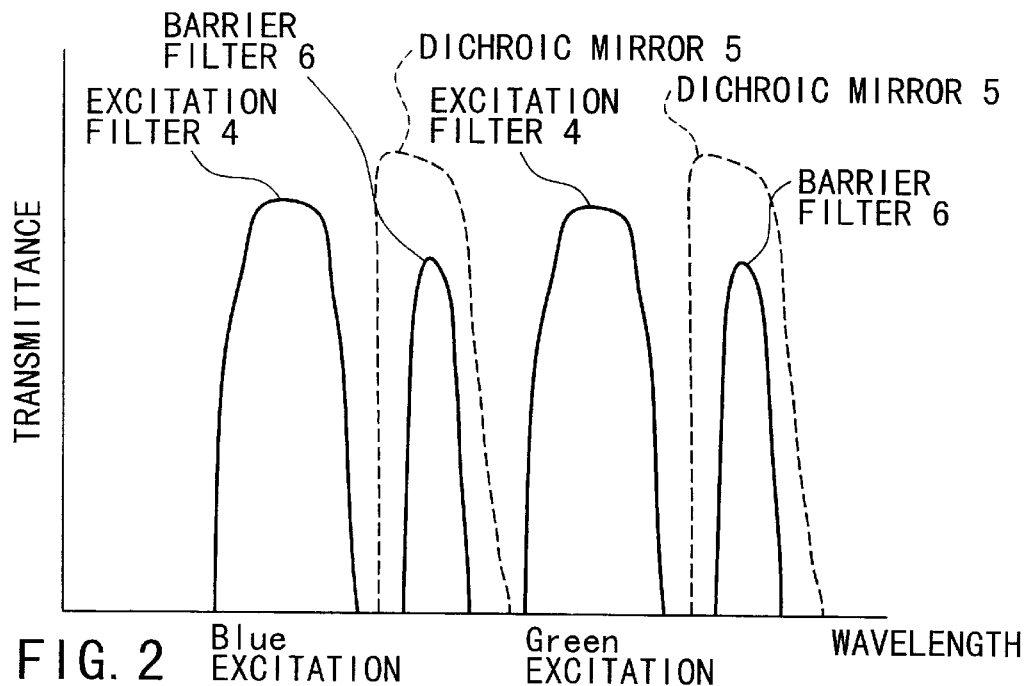
FIG. 2
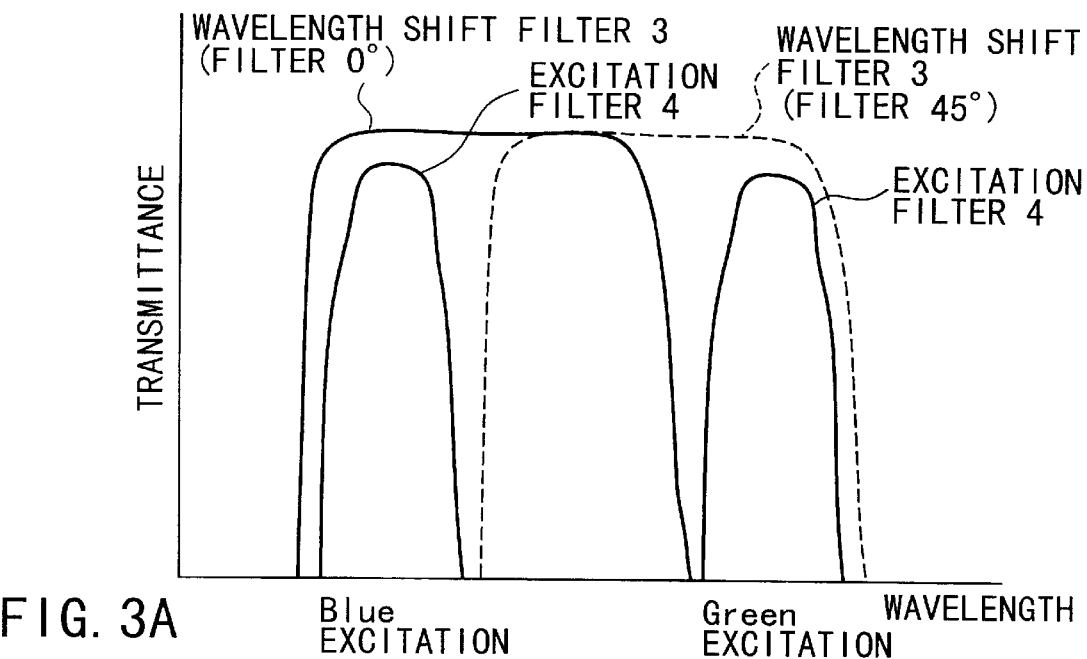
FIG. 3A
FIG. 3B
| | STATE OF FILTER | | TRANSMITTING FLUORESCENCE |
| --- | --- | --- | --- |
| | 0° | 45° | |
| STATE NO. 1 | O | | Blue |
| STATE NO. 2 | | O | Green |

FLUORESCENT MICROSCOPE

BACKGROUND OF THE INVENTION

The present invention relates to a fluorescent microscope which is mainly used in the medicine and biology, and in which the fluorescent dye of one specimen dyed with a lot of kinds of different fluorescent dyes is separated and an image of each fluorescent dye is separately imaged with an imaging element of black and white, thereafter the image of each fluorescent dye is overlapped and observed at the same time.

In general, a reflected light fluorescent microscope widely used to detect the protein and the gene, etc. to which a fluorescent marker is performed on the bio-organ and the cell in several fields including medicine and biology.

Especially, in recent years, by developing various fluorescent dyes, the reflected light fluorescent microscope is used to examine position interrelationship of specific material and localization of specific material in cell by a multiple dye to mark and identify various materials with a different fluorescent dye.

By the way, conventionally, when the multiple dye specimen is observed with this reflected light fluorescent microscope, the fluorescent filter set in which an excitation filter, a dichroic mirror, and the barrier filter to observe a single fluorescent dye are to be one set, is prepared for each specific fluorescent dye, beforehand, respectively, and specific fluorescent dyes are observed one by one by changing the fluorescent filter set to be the best combination for the fluorescent dye. And, when the position of each fluorescent dye is checked, each fluorescent image is multiple recorded and displayed in a photograph and a video memory.

However, in the above-mentioned reflected light fluorescent microscope, not only it becomes expensive but also it takes time to operate the change of a fluorescent filter, since it is necessary to prepare many kinds of fluorescent filter sets. A large space is required for the device and the operation.

On the other hand, there is a method of observing the distribution of the density of the ion in the cell and the target change at the time of passing as an image by using the fluorescent dyes which change the excitation spectrum (wavelength excited easily) reacting on the change of the density of the ion such as $Ca^{2+}$ ions disclosed in Japanese Patent Application KOKAI Publication No. 2-28542 (whose corresponding U.S. patent application, which has been withdrawn, is Ser. No. 08/340,236, filed Apr. 19, 1989). In this method, the distribution of the density of the ion is displayed by preparing the two kinds of excitation filters which the wavelength to which fluorescent dyes are excited easily most at each state of certain different two specific ion densities, changing the excitation filters, and calculating the ratio of fluorescent strength in each state of excitation.

Since the change in the characteristic of the fluorescent dye can be obtained by changing only the excitation filter without changing the fluorescent filter set, the little number of pieces of the filters are required and cheapness and occupied space can be reduced according to this method.

However, this method is a method of identifying the change in the characteristic of one kind of a fluorescent dye, but is not a method of identifying different kinds of fluorescent dyes. It is necessary to prepare the same number of the excitation filters as the kinds of the fluorescent dyes which try to be identified and perform the change operation even when trying to apply to the identification of the kind of the fluorescent dye. Therefore, a disadvantage of becoming expensive with requiring many filters entirely and a disadvantage of taking time for the change operation, and needing a large space cannot be solved as a result.

In addition, means to change the transmitting wavelength band of the filter without changing the filter, in which this technique is well-known in the prior art, has been described in the U.S. Pat. No. 5,371,624. In both of these publications, the transmitting wavelength band is changed by combining with the fluorescent filter set with the plurality of transmitting wavelength band to observe a plurality of fluorescent dyes at the same time, in addition, the excitation filter or the barrier filter which uses another interference film is prepared, and changing the length of the interference optical path by rotating the excitation filter or the barrier filter around a rotation axis vertical to the optical axis.

However, these methods are the methods to adjust the balance of the brightness of the fluorescence of each fluorescent dye suitably, and to make easily to observe when a plurality of fluorescent dyes are observed at the same time, but not the methods of separating a different fluorescent dye and identifying it.

The fluorescent filter set, in which a plurality of different fluorescent dyes can be observed at the same time without changing the fluorescent filter set is described in the publications as mentioned above. There are a method of imaging a fluorescent image with the imaging element of the color and a method of imaging a fluorescent image with the imaging element of black and white by using the Michelson interferometer and the diffraction grating when the fluorescent image is imaged.

However, a disadvantage in which sensitivity is insufficient and the exposure time not only becomes a long in the color imaging element but also the noise component in the image increases, and the resolution is deteriorated since a fluorescent image is generally slight light is raised.

Since the spectrum device becomes large-scale and expensive in the method of imaging a fluorescent image with the monochrome imaging element, not only a large space for the installation but also a long time are required to obtain the spectrum. Therefore it is still undesirable.

In addition, each of both methods of imaging with the above-mentioned color imaging element and imaging with the imaging element of black and white is a method of comparing the spectrum intensity characteristic of a fluorescent image with the spectrum characteristics of the luminescence fluorescence of the fluorescent dye to specify the fluorescent dye, and there is a disadvantage of missing to accuracy.

BRIEF SUMMARY OF THE INVENTION

An object of the present invention is to provide a fluorescent microscope which is cheap, occupies a sufficiently small space required for device and operation, and can accurately separate and identify different many kinds of fluorescent dyes promptly in an easy operation.

A fluorescent microscope to observe a specimen dyed with a plurality of fluorescent dyes according to the present invention comprises: a first filter which selectively transmitting light from a light source; a dichroic mirror which leads an light transmitting the first filter to the specimen and transmits fluorescence from the specimen; a second filter which selectively transmitting fluorescence from the specimen; a changing section to change at least one transmitting wavelength bands of the first filter and the second filter; a detection section to detect the wavelength selected by the changing section; an imaging element which images an image of the specimen; and an identification section to identify a kind and the position of the fluorescent dyes with which the specimen is dyed based on a wavelength data obtained from the detection section before and after a change in the transmitting wavelength band by the wavelength change section and a change in the image according to a change in the transmitting wavelength band.

With such a configuration, if the correlation of the change of the changed transmitting wavelength characteristic of the excitation filter or the barrier filter and the intensity change of the image beforehand is known, the kind and the position of the fluorescent dye can be specified by detecting the intensity change based on information on optical intensity of a monochrome image imaged by the imaging element and the detected signal of the selected wavelength. Therefore, the kind and the position of the fluorescent dye can be specified more accurately with an easy operation compared with the method of detecting the spectrum intensity characteristic of actual fluorescence and comparing it with the fluorescent luminescence characteristic of the fluorescent dye.

Preferred manners are as follows in the above-mentioned fluorescent microscope.

(1) At least one of the first filter and the second filter has a plurality of filters.

With such a configuration, in addition to an advantage of the above-mentioned fluorescent microscope, since the change in large fluorescent intensity by combining plural filters with a little amount of the wavelength change can be observed even if the amount of the wavelength change of the wavelength of the transmitting a filter band is a little, the kind and the position of the fluorescent dye can be accurately specified.

(2) At least one of the first filter and the second filter includes an interference filter, and the change section changes a transmitting wavelength band by rotating the interference filter around a rotation axis vertical to an optical axis.

With such a configuration, in addition to an advantage of the above-mentioned fluorescent microscope, since the transmitting wavelength band can be changed by an easy technique of, e.g., inclining the filter, it can be achieved to become a simple structure and cheap device, and miniaturize the device.

(3) At least one of the first filter and the second filter includes an interference filter which continuously variably set a film thickness of a part inserted in an optical axis, and the change section changes a transmitting wavelength band by vertically changing the film thickness of the interference filter to the optical axis.

With such a configuration, in addition to an advantage of the above-mentioned fluorescent microscope, if the degree of the change in the film thickness is suitably set, the adjustment of the amount of the change of the desired transmitting wavelength band is easily performed.

(4) At least one of the first filter and the second filter has a polarizing plate and a variable phase plate in which a phase difference is variable, and the change section changes a transmitting wavelength band by changing a phase of the variable phase plate.

With such a configuration, in addition to an advantage of the above-mentioned fluorescent microscope, since it is also possible the desired amount of the wavelength change not only easily becomes a possible setting but also to change the amount of the phase without a mechanical movable section if the change in the phase is suitably set, the change operation can be with high speed and a configuration with excellent durability can be achieved and furthermore, the device can be achieved in the smaller scale.

(5) The interference filter includes a plurality of interference filters arranged in the series to the optical axis.

(6) The interference filter includes a plurality of interference filters, and the plurality of interference filters are switched and used respectively.

(7) The first filter includes an excitation filter.

(8) The second filter includes a barrier filter.

As described above in detail, a fluorescent microscope which is cheap, has a sufficiently small space required for device and operation, and can accurately separate and identify different many kinds of fluorescent dyes promptly in an easy operation, can be provided according to the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a figure to explain the operation according to the first embodiment;

FIG. 3A and FIG. 3B are figures to explain the operation according to the first embodiment;

Figure 1:
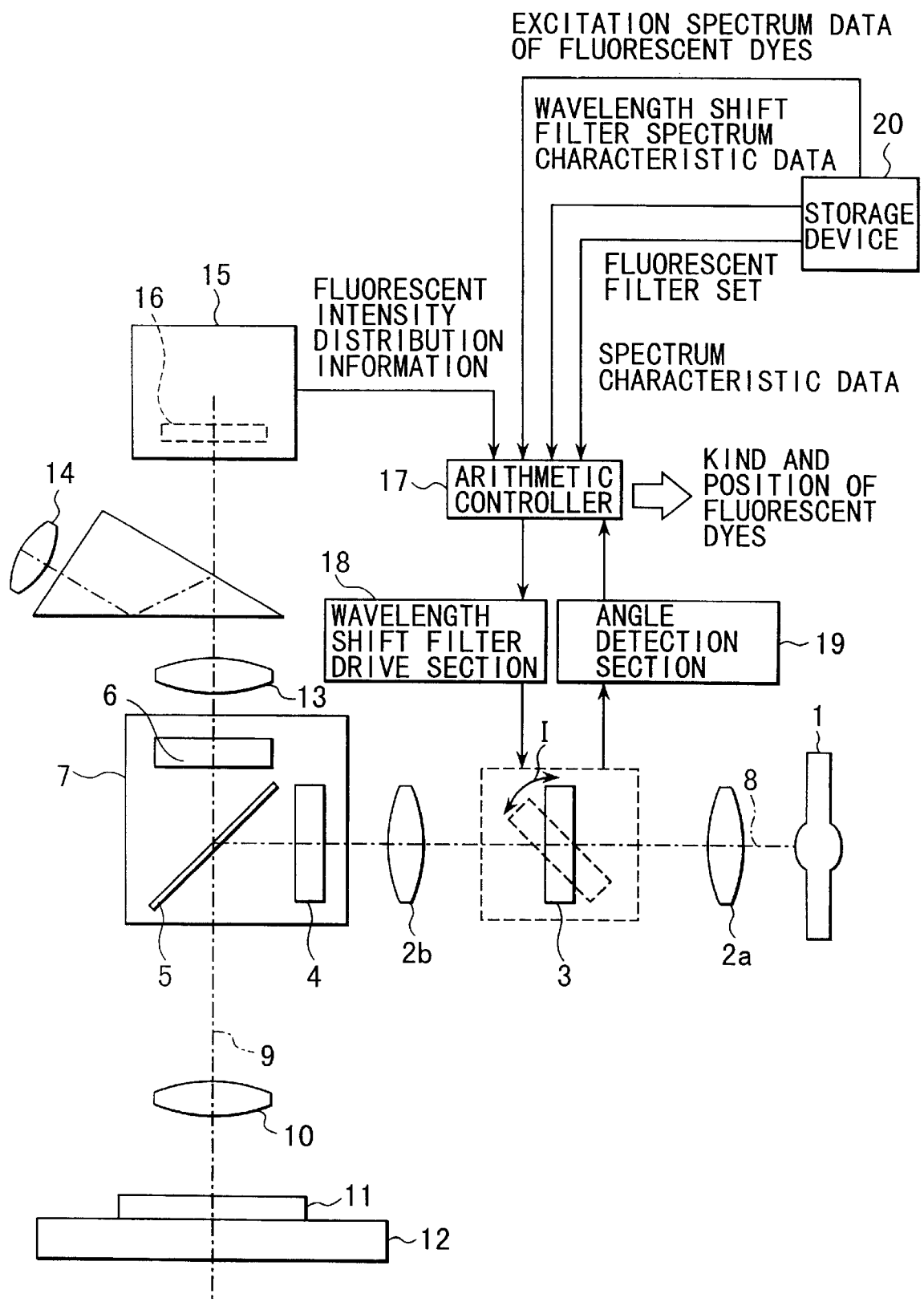
FIG. 1 is a figure which shows the schematic configuration of fluorescent microscope according to the first embodiment of the present invention.

DETAILED DESCRIPTION OF THE INVENTION (First Embodiment)

Hereinafter, a first embodiment when the present invention is applied to a reflected light fluorescent microscope will be explained referring to the drawings.

FIG. 1 is a figure which shows the schematic configuration of a fluorescent microscope according to the first embodiment of the present invention, and the illumination light emitted from light source 1 becomes substantially parallel light by illumination lens 2a, transmits wavelength shift filter 3, and is focused to the vicinity of the exit pupil of objective lens 10 by illumination lens 2b. At this time, the illumination light is reflected with dichroic mirror 5 and then is transmits objective lens 10 after the wavelength is selected when transmitting excitation filter 4. Thereafter, the illumination light is irradiated to specimen 11 allocated on stage 12.

The fluorescence originated from specimen 11 caused by this irradiation becomes parallel light by objective lens 10, transmits dichroic mirror 5, transmits absorption filter 6 after selecting the wavelength, and is projected as a fluorescent image by image formation lens 13. It becomes possible to observe the fluorescent image by watching through eyepiece 14, observe the fluorescent image imaged by imaging device 15 which has imaging element 16 having, for example, CCD to which a fluorescent image is projected, and observe the image by the monitor (not shown).

Fluorescent intensity distribution information of the image obtained by this imaging device 15 is sent to arithmetic controller 17. Arithmetic controller 17 controls above-mentioned wavelength shift filter drive section 18 to drive the rotation angle of wavelength shift filter 3, and detects the rotation angle of the wavelength shift filter 3 by angle detection section 19. And, arithmetic controller 17 reads fluorescent intensity distribution information sent from above-mentioned imaging device 15, spectrum data of the fluorescent dye memorized to memory device 20 beforehand, the spectrum characteristic data of above-mentioned wavelength shift filter 3, and the spectrum characteristic data of fluorescent filter set 7, and executes the arithmetic described later, and calculates the kind of the fluorescent dyes and the positions to display and output it.

Hereinafter, imaging device 15 images the image of black and white, and a case of observing a fluorescent image which is imaged by imaging device 15 by the monitor will be explained.

Next, an operation of the embodiment will be explained.

Here, first, the spectrum characteristic of fluorescent filter set 7, in which above-mentioned excitation filter 4, dichroic mirror 5, and barrier filter 6 are to be one set, will be explained in detail, regarding to specimen 11 referring to FIG. 2.

Specimen 11 is assumed to be dyed with two different fluorescence dyes of Blue (blue) excitation dye and Green (green) excitation dye beforehand. Fluorescent filter set 7 can observe these two kinds of fluorescent dyes at the same time, and the graph of the spectrum characteristic is shown in FIG. 2.

A horizontal axis indicates the wavelength and the vertical axis indicates permeability in the graph in FIG. 2. Excitation filter 4, dichroic mirror 5, and barrier filter 6 have two transmitting wavelength bands respectively as understood from this graph.

Excitation filter 4 has the transmitting wavelength band in the wavelength band where each of two kinds of fluorescent dyes is excited easily, and dichroic mirror 5 and barrier filter 6 have the transmitting wavelength band in each fluorescent luminescence wavelength band of the fluorescent dye. Therefore, two kinds of fluorescent dyes can be observed at the same time without changing fluorescent filter 7.

Next, it will be explained in detail by using FIG. 3A and FIG. 3B concerning above-mentioned wavelength shift filter 3. The graph shown in FIG. 3A shows the spectrum permeability of wavelength shift filter 3 and excitation filter 4.

Wavelength shift filter 3 is constructed by the interference film, and has the transmission band whose width of the wavelength is wider than the transmitting wavelength band of excitation filter 4 as shown in this graph, and has one transmitting wavelength band differing from excitation filter 4.

On the other hand, as shown in FIG. 1 the movement by arrow I, wavelength shift filter 3 is held rotatably in which a vertical rotation axis to illumination optical axis 8 is a rotation center. And, wavelength shift filter 3 is positioned either the position of two stages of a vertical position to illumination optical axis 8 and the position which inclines by 45° (position shown by dotted line in FIG. 1) by wavelength shift filter drive section 18, and driven.

Angle detection section 19, which detects whether wavelength shift filter 3 is positioned at a vertical position for illumination optical axis 8 or at the position which inclines by 45°, is allocated to wavelength shift filter 3.

The change in the spectrum permeability in the inclined state with rotating this wavelength shift filter 3 is shown in the graph of FIG. 3A. That is, in FIG. 3A, the solid line shows wavelength shift filter 3 is vertical to illumination optical axis 8 (filter 0° in FIG. 3A) is shown, and the excitation wavelength band for the Blue excitation (lye is transmitted. On the other hand, the dashed line shows wavelength shift filter 3 is in the state of 45° to illumination optical axis 8 (filter 45° in FIG. 3A) is shown, and the excitation wavelength band for the Green excitation dye is transmitted.

Thus, exciting only one kind of dye among two kinds of dyes by shifting the transmitting wavelength band becomes possible by inclining wavelength shift filter 3, and changing the length of the interference optical path.

Next, a method of identifying kind and position of fluorescent dye actually will be explained.

First, only the Blue excitation dye is excited and fluorescence is originated as mentioned above in FIG. 3A when the inclination of wavelength shift filter 3 shown in FIG. 3B is 0°, which is state No. 1. In this state No. 1, angle detection means 9 detects the inclination of wavelength shift filter 3 is 0° and sends the information to arithmetic controller 17.

By the way, the spectrum permeability data of wavelength shift filter 3 and fluorescent filter set 7, respectively, and the excitation spectrum data of the fluorescent dye are memorized to memory device 20 beforehand, and, especially, the data of the relationship of the change in the rotation angle and the spectrum permeability is also memorized thereto concerning wavelength shift filter 3.

Arithmetic controller 17 receives information of which an inclination of wavelength shift filter 3 is 0° from angle detection means 9, and reads the spectrum permeability data when the inclination of wavelength shift filter 3 is 0° from memory device 20. In addition, arithmetic controller 17 recognizes that only the Blue excitation dye is currently excited by reading the spectrum permeability data of fluorescent filter set 7 and the excitation spectrum data of the fluorescent dye, and compares them.

Next, arithmetic controller 17 reads fluorescent intensity distribution information, which is two dimensional distribution data of fluorescent intensity of an actual image, from imaging device 15, and judges the part, which shines on imaging element 16, is Blue excitation dye.

Next, arithmetic controller 17 sends an instruction to wavelength shift filter drive device 18, inclines wavelength shift filter 3 to illumination optical axis 8 by 45°, and makes it state No. 2 shown in FIG. 3B. In this case, only the Green excitation dye is excited, and fluorescence is originated in specimen 11 as mentioned above. Even in this state No. 2, arithmetic controller 17 judges a position where the Green excitation dye shines by receiving information from angle detection section 19 like as above-mentioned state No. 1, reading data from memory device 20, recognizing that only the Green excitation dye is currently excited, reading actual fluorescent intensity distribution data from imaging device 15 next, and comparing them.

Finally, identifying the kind and the position of the fluorescent dye from each judgment result by changing the rotation position of wavelength shift filter 3 like this in state No. 1 and state No. 2 becomes possible, and this result of the judgment is displayed and output.

As described above, according to the first embodiment of the present invention, since the kind and the position of the fluorescent dye can be identified by an easy operation of only inclining wavelength shift filter 3 to illumination optical axis 8, and fluorescent filter set 7 need not be changed, the device can be made cheap and can be small-scale ones.

Since only wavelength shift filter 3 on illumination side is inclined, disadvantage in which the center of the observation optical axis shifts is not occurred by wedges of barrier filter 6 and dichroic mirror 5 occurred when fluorescent filter set 7 is changed.

(Second Embodiment)

Hereinafter, a second embodiment when the present invention is applied to reflected light fluorescent microscope will be explained referring to the drawings.

Figure 4:
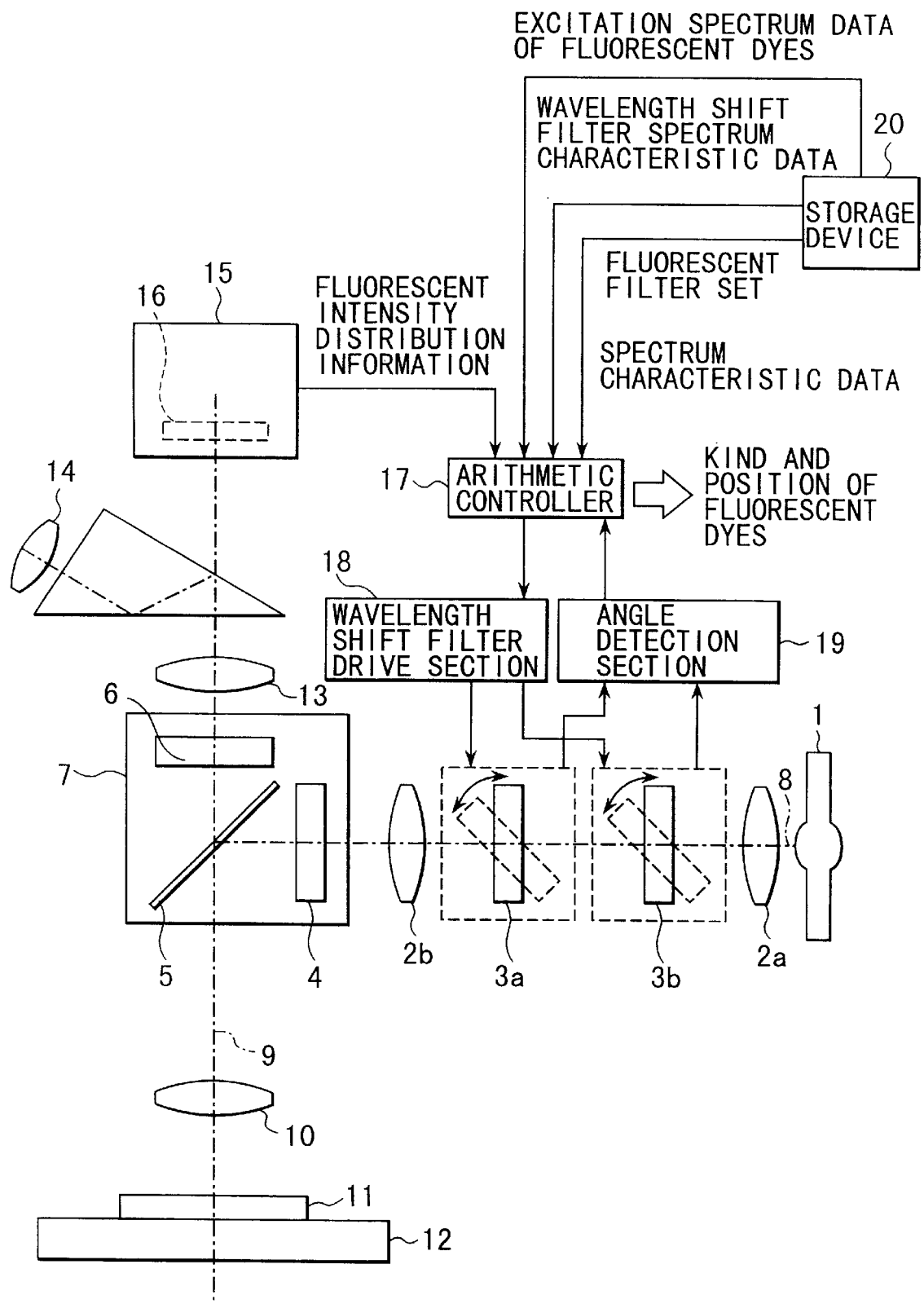
FIG. 4 is a figure which shows the schematic configuration of fluorescent microscope according to the second embodiment of the present invention.

FIG. 4 is a figure which shows the schematic configuration of a fluorescent microscope according to the second embodiment of the present invention, and since a basic configuration is similar to FIG. 1, the same mark is fixed to the same part and the explanation will be omitted.

In FIG. 4A and FIG. 4B, a plurality of wavelength shift filters, e.g., first and second wavelength shift filters 3a and 3b, which are similar to wavelength shift filter 3 shown in FIG. 1, are allocated on illumination optical axis 8, the rotation position to each illumination optical axis 8 is individually controlled by wavelength shift filter drive section 18, and the rotation position is detected by angle detection section 19.

Next, an operation of the second embodiment will be explained.

Here, specimen 11 is assumed to be dyed with three kinds of fluorescent dyes, that is, Blue (blue) excitation dye, Green (green) excitation dye and Red (red) excitation dye.

Fluorescent filter set 7 has same characteristic as the first embodiment, and only the point in which transmitting wavelength bands are three to correspond to three kinds of fluorescent dyes, is different from the first embodiment.

Next, first wavelength shift filter 3a and second wavelength shift filter 3b will be explained referring to FIG. 5A and FIG. 5B. The first and second wavelength shift filters 3a and 3b are arranged on illumination optical axis 8, and have different spectrum permeability, respectively. FIG. 4A shows a graph of the spectrum permeability.

It is assumed that the first wavelength shift filter 3a has non-transmitting band with slightly wider width of wavelength than transmitting wavelength band of excitation filter 4, and the second wavelength shift filter 3b has one transmission band of the width of the wavelength twice the transmitting wavelength band of excitation filter 4.

The first and second wavelength shift filters 3a and 3b is inclined at illumination optical axis 8 by the rotation drive of wavelength shift filter drive section 18 as well as the first embodiment, to be positioned, and the positioning is performed independently.

Dashed line in the graph of FIG. 4A shows the characteristic of the state to incline the first and second wavelength shift filters 3a and 3b respectively by 45°. Three states of state No. 1 to state No. 3 can be set as shown in FIG. 4B, when the states of inclining these two wavelength shift filters 3a and 3b independently are combined. Mark ○ in the figure shows the inclination of the first wavelength shift filter 3a and the second wavelength shift filter 3b.

Figures 5A, 5B:
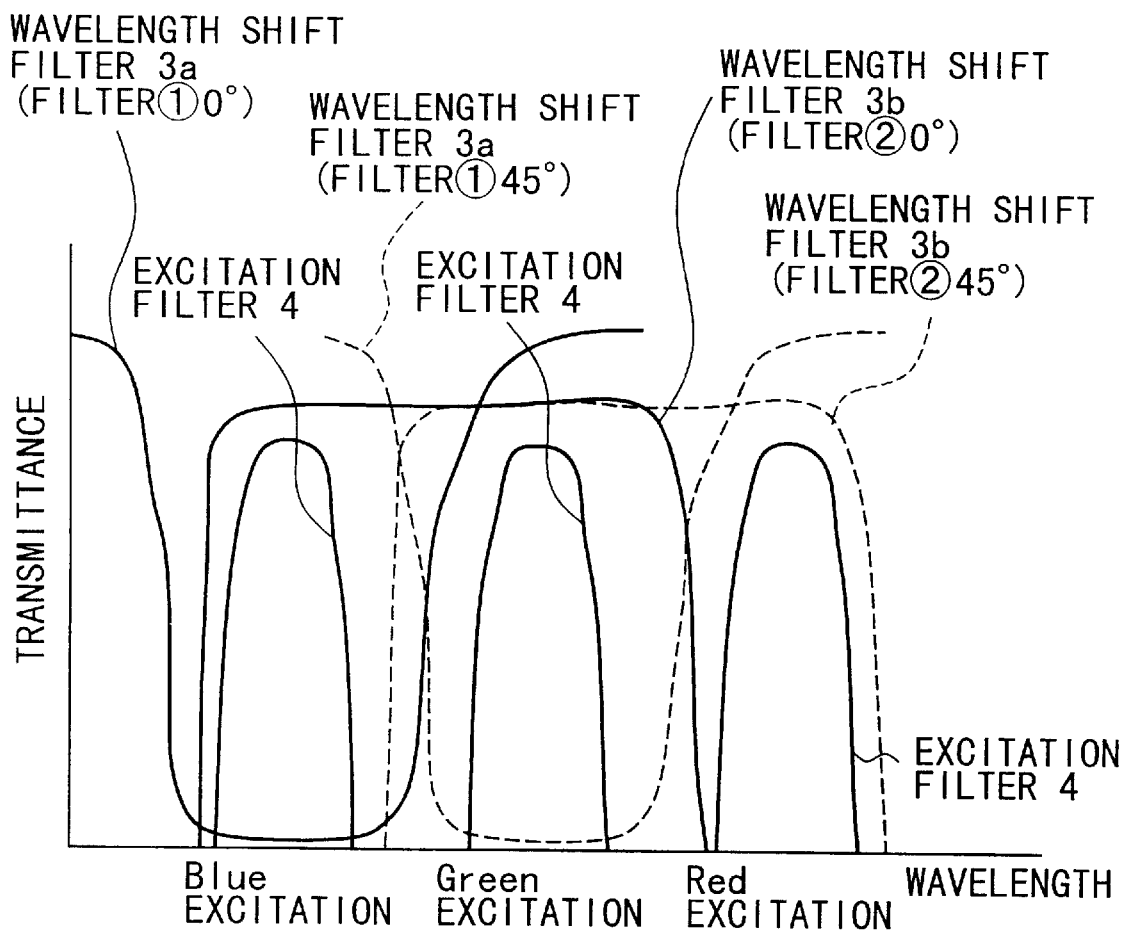
FIG. 5A and FIG. 5B are figures to explain the operation according to the second embodiment.

As is understood from FIG. 5B, only the Blue excitation dye is excited in state No. 1 to emit fluorescence, only the Red excitation dye is excited in state No. 2 to emit fluorescence, and only the Green excitation dye is excited in state No. 3 to emit fluorescence.

These states No. 1 to No. 3 are judged by rotating first and second wavelength shift filters 3a and 3b and performing the arithmetic processing by arithmetic controller 17 as well as the first embodiment, thereby the kind and the position of three kinds of fluorescent dyes can be identified.

As described above, according to the second embodiment, the same effect as the first embodiment can be achieved. In addition, since a plurality of (two pieces of) wavelength shift filters 3 are combined and used, even when the amount of the shift of the wavelength obtained by inclining it by using one wavelength shift filter 3 alone can not become large, many kinds to which the excitation wavelength parts, for instance, three kinds of fluorescent dyes respectively by a little amount of the shift can be separated and identified.

(Third Embodiment)

Hereinafter, a third embodiment when the present invention is applied to reflected light fluorescent microscope will be explained referring to the drawings.

The drawing and the explanation of the entire configuration will be omitted since configuration thereof is basically similar to FIG. 4.

Next, an operation of the third embodiment will be explained.

It is assumed that specimen 11 is dyed with four kinds of fluorescent dyes, that is, UV (ultraviolet light) excitation dye, Blue (blue) excitation dye, Green (green) excitation dye, and Red (red) excitation dye, and fluorescent filter set 7 corresponds to four above-mentioned kinds of fluorescent dyes.

The transmitting wavelength band shifts according to the rotation position with wavelength shift filter 3 by the same configuration and the operation as the first embodiment. The change by the spectrum permeability characteristic and the wavelength shift is shown in FIG. 6A.

Figures 6A, 6B:
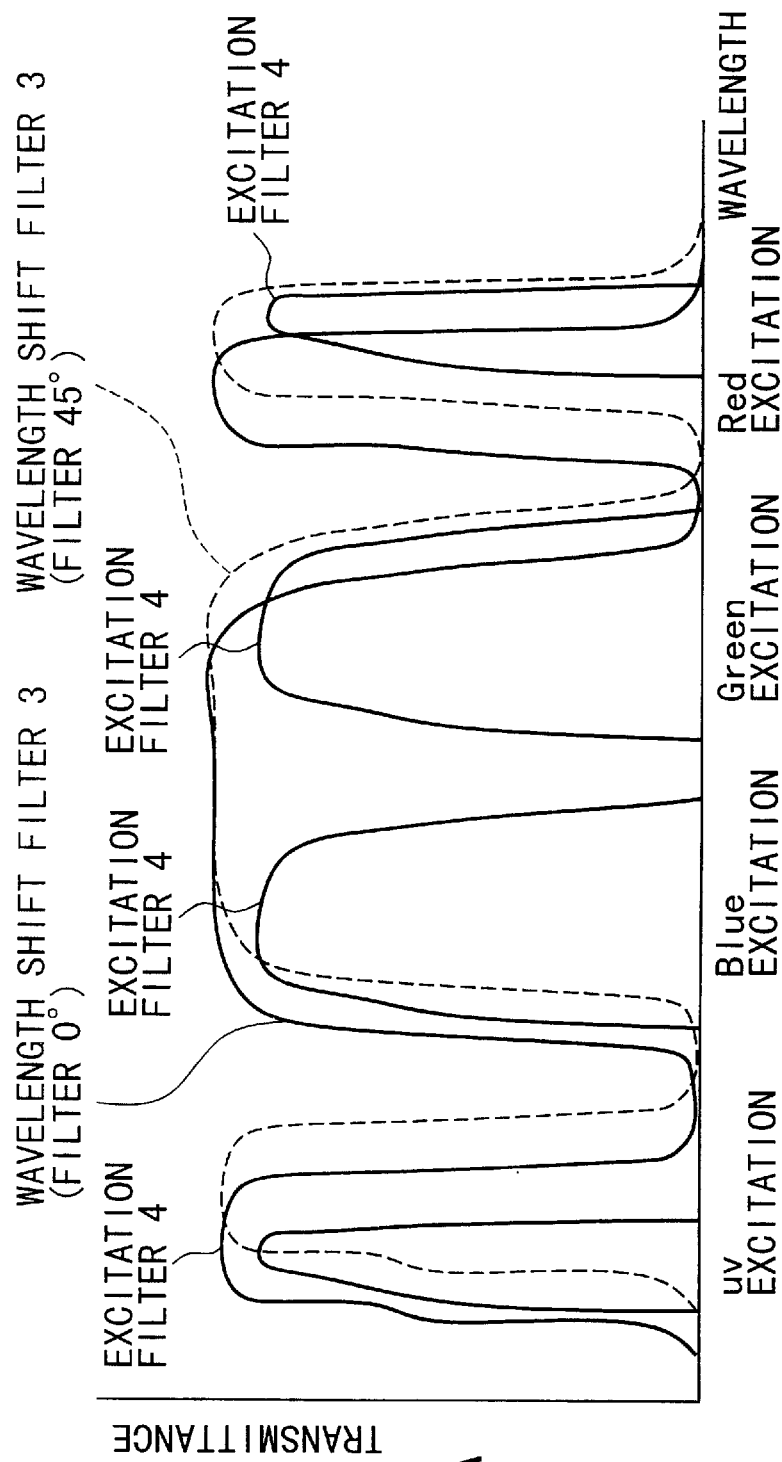
FIG. 6A and FIG. 6B are figures to explain the operation according to the third embodiment of the present invention.

As show in FIG. 6A, wavelength shift filter 3 ahs four transmitting wavelength bands and when the rotation position thereof to illumination optical axis 8 is inclined from 0° to 45°, the transmitting wavelength band changes the state of the solid line to dashed line in the graph. The change in the excited light intensity for four kinds of fluorescent dyes at this time is shown in FIG. 6B. The intensity [%] in FIG. 6B means the state that all excited lights, to which each transmitting wavelength band of excitation filter 4 is transmitted, are irradiated to the specimen is 100[%].

Thus, when wavelength shift filter 3 is changed from state No. 1 of 0° into state No. 2 of 45°, the excited light intensity lowers such that the Blue excitation thereof lowers from 100 to 50% and the UV excitation thereof lowers from 100 to 90%, respectively, then, oppositely, the excited light intensity rises such that the Red excitation thereof rises from 50 to 100% and the Green excitation thereof rises from 90 to 100%, respectively.

Arithmetic controller 17 reads rotation position information of wavelength shift filter 3 from angle detection section 19 and various data from memory device 20, reads fluorescent intensity distribution information at state No. 1 and state No. 2 from imaging device 15, calculates the fluorescent intensity ratio of state No. 1 and state No. 2 corresponding to each pixel of imaging element 16 of imaging device 15, and recognizes the change in the state as well as the operation of the first embodiment.

Since it is known that fluorescent intensity changes from 100% into 50% in UV excitation by data obtained from angle detection section 19 and memory device 20 when changing, for example, from state No. 1 into state No. 2, arithmetic controller 17 can specify the position of the UV excitation dye by comparing it with the calculation result of the intensity ratio of the fluorescent image actually taken.

By similarly specifying the position of other fluorescent dyes, as a result, it becomes to separate and identify all of kinds and positions of four kinds of fluorescent dyes.

According to the first and second embodiments, same number of identified dyes as the number which is sum of the number of pieces of wavelength shift filters 3 (3a, 3b) and excitation filters 4 is necessary.

In adopting such a method, in the third embodiment, the kinds and the positions of four kinds of the fluorescent dyes can be identified in the lump even by the little number of pieces of the filter and the number of operations of inclining, such that only one wavelength shift filter is inclined once for example. Therefore, not only cheap device but also small-scale device can be provided, and the work required to identification processing can be completed by shorter time.

Figure 7:
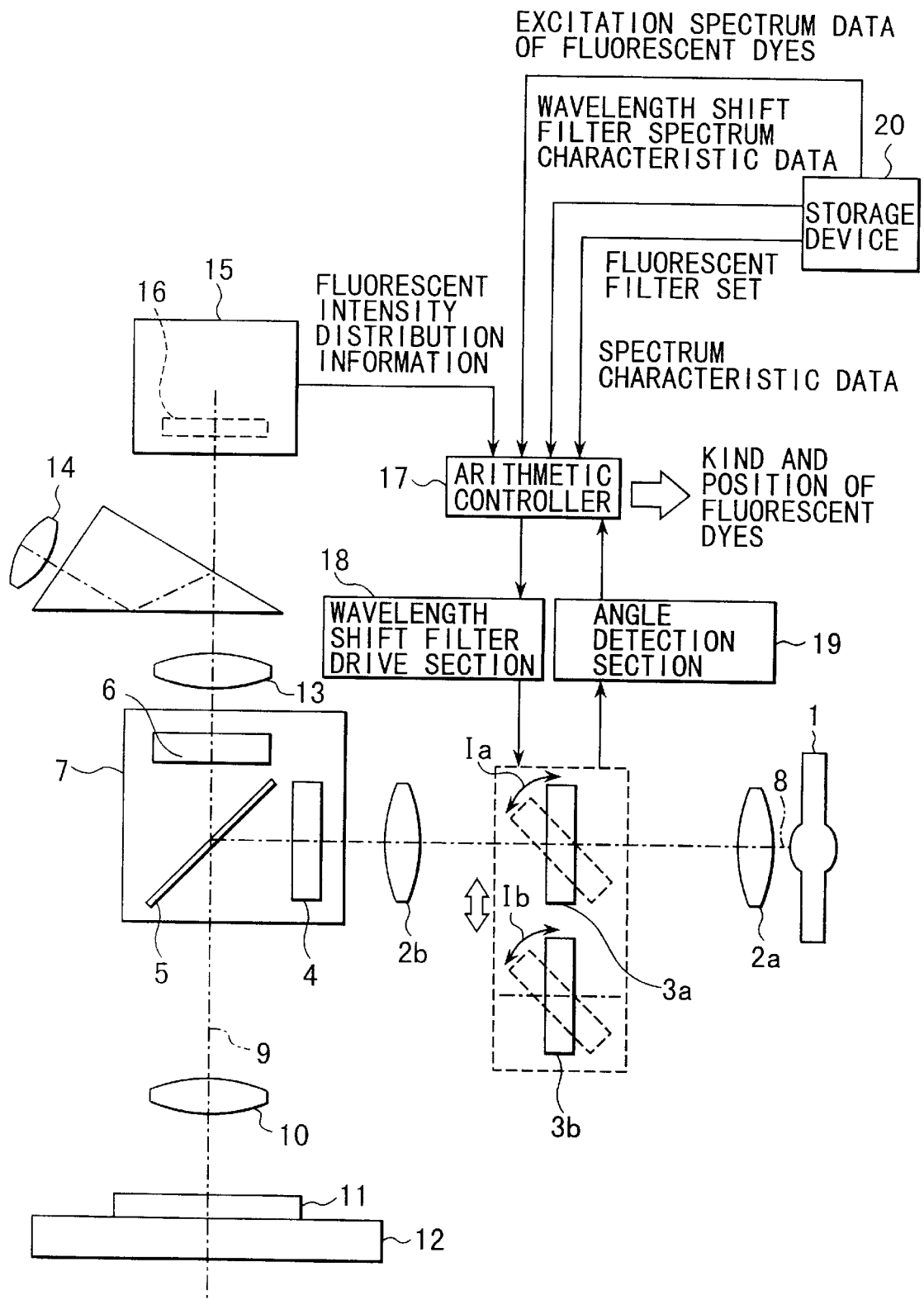
FIG. 7 is a figure which shows the modification according to the third embodiment.

As modification of the third embodiment, as shows in FIG. 7, two kinds of first and second wavelength shift filters 3a and 3b are prepared, and two kinds of fluorescent filter sets 7 whose characteristic coincide with each of wavelength shift filters 3a and 3b are prepared. It becomes possible to identify the kinds and positions up to 8 kind of fluorescent dyes which is twice kinds thereof by selectively changing wavelength shift filters 3a and 3b for example on illumination optical axis 8 with the slider mechanism to insert and remove them with the combination coincide with each characteristics.

(Fourth Embodiment)

Hereinafter, a fourth embodiment when the present invention is applied to reflected light fluorescent microscope will be explained referring to the drawings.

Figure 8:
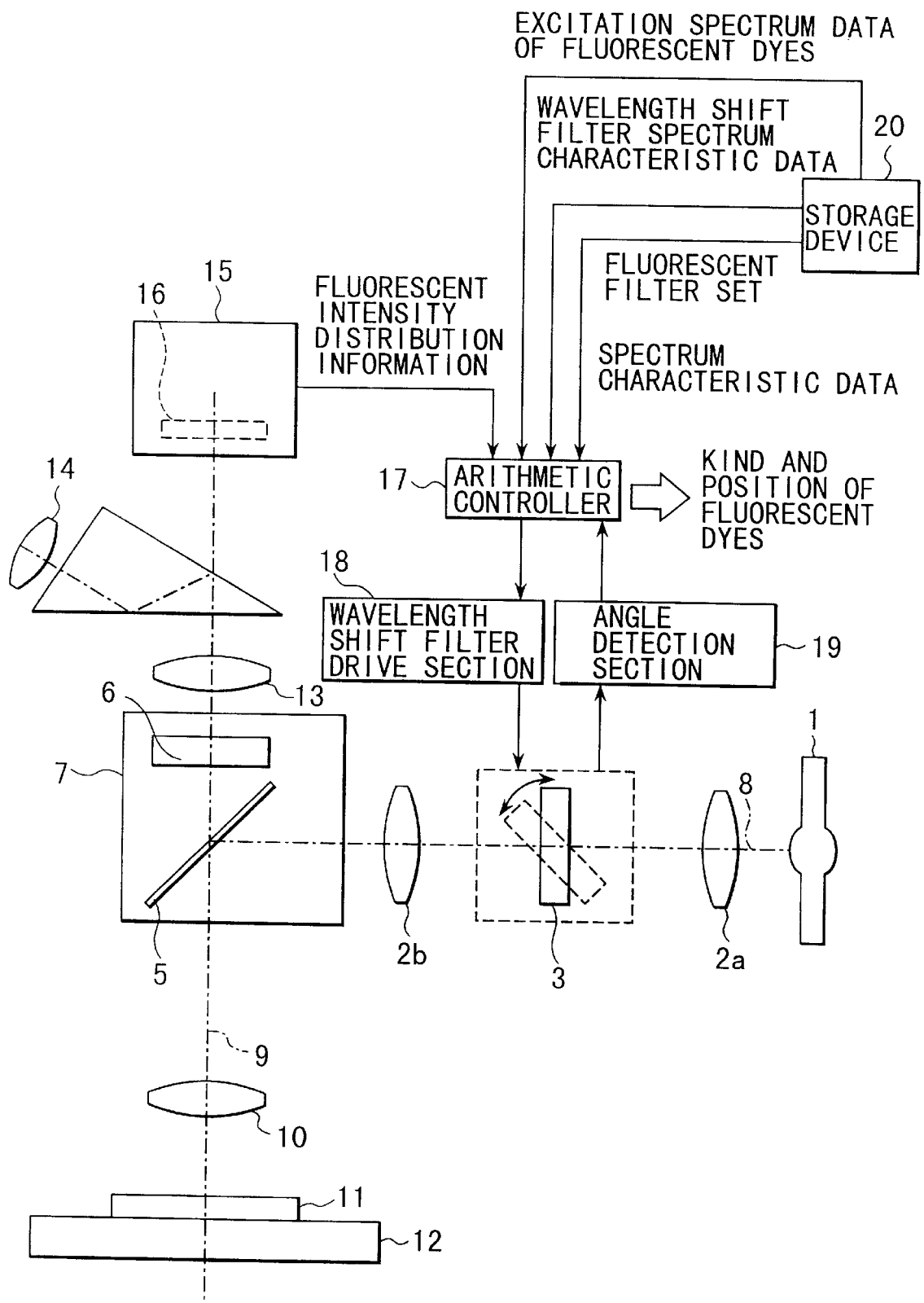
FIG. 8 is a figure which shows the schematic configuration of fluorescent microscope according to the fourth embodiment of the present invention.

FIG. 8 is a figure which shows the schematic configuration of a fluorescent microscope according to the fourth embodiment of the present invention, and since a basic configuration is similar to FIG. 1, the same mark is fixed to the same part and the explanation will be omitted.

In this embodiment, excitation filter 4 of fluorescent filter set 7 is omitted, and the illumination light collected by illumination lens 2b is reflected directly with dichroic mirror 5 in fluorescent filter set 7, inclines to observation optical axis 9 and arrives at objective lens 10.

Next, an operation of the fourth embodiment will be explained.

Here, Specimen 11 is assumed to be dyed with two different fluorescence dyes of Blue (blue) excitation dye and Green (green) excitation dye beforehand.

Figure 9:
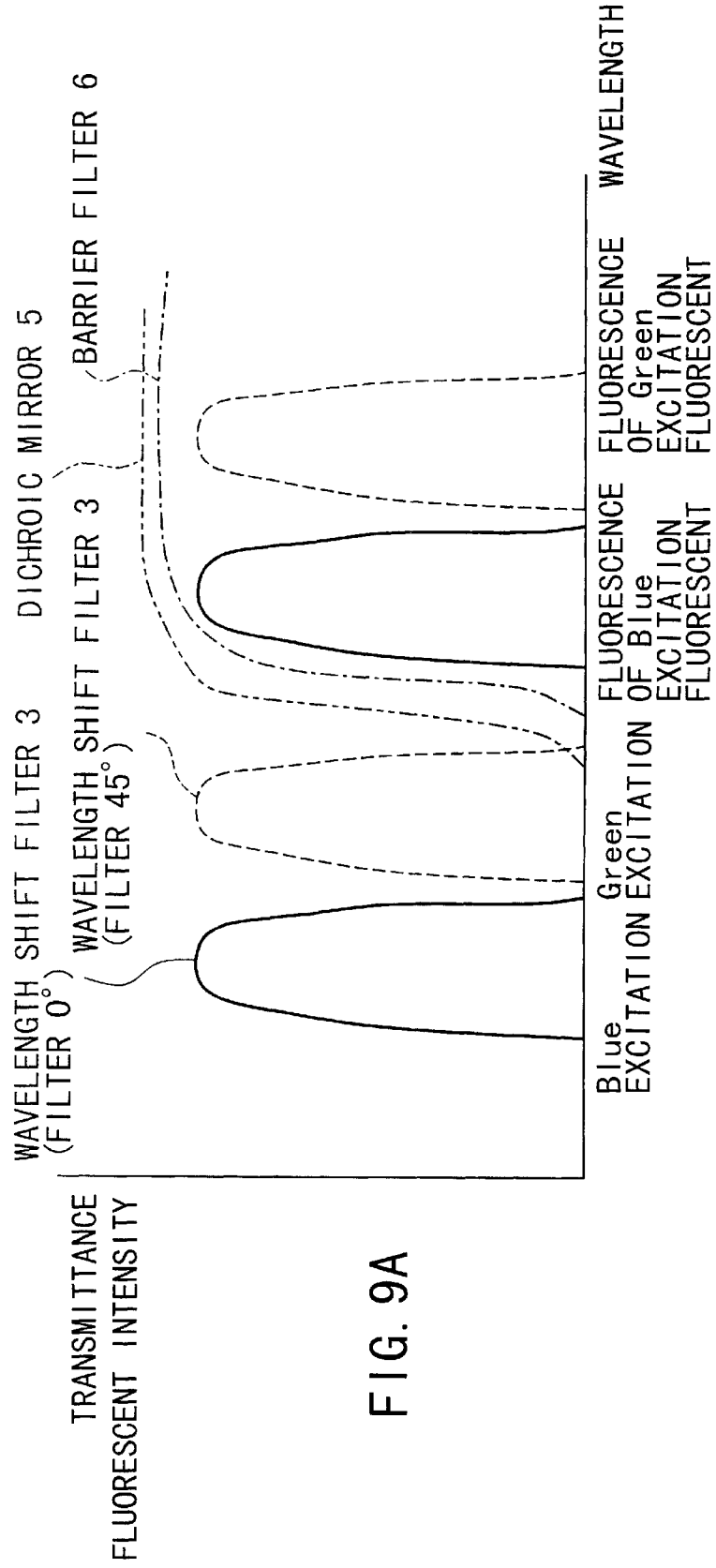
FIG. 9A and FIG. 9B are figures to explain the operation according to the fourth embodiment.

Wavelength shift filter 3 and fluorescent filter set 7 have the spectrum permeability shown in the graph of FIG. 9A, and have configurations in which the excitation filter is excluded from the fluorescent filter set for the single fluorescent dye generally used. Here, wavelength shift filter 3 has the function of the excitation filter, and is assumed to have only one transmission band of narrow width of the wavelength as shown in the graph of FIG. 9A.

The technique, in which the transmitting wavelength band of wavelength shift filter 3 is shifted, is a characteristic of the state that it is the same as the first embodiment, and dashed line is inclined in the graph by 45°. since two kinds of fluorescent dyes which dye this specimen 11 has mutually near excitation spectrum and the wavelength of the excitation wavelength and the luminescence fluorescence is away, the excited light is reflected with the dichroic mirror 5 and fluorescence can transmit dichroic mirror 5 and barrier filter 6 even if which dye is excited.

In the above-mentioned technique, state No. 1 of previous in which the wavelength of wavelength shift filter 3 is shifted and the following state No. 2 are shown in FIG. 9B. Even if the excitation wavelength suitable for the excitation spectrum of the Blue excitation dye in, for instance, state No. 1 is selected, the dye of the Green excitation slightly originates fluorescence since the excitation spectrum is near in two kinds of fluorescent dyes. Therefore, if fluorescent strength is assumed to be 100% when the excitation wavelength suitable for each dye is selected, fluorescent strength of the dye of the Green excitation becomes 10% in state No. 1.

The kinds and the positions of two kinds of fluorescent dyes can be identified by comparing data from memory device 20 and the calculation result of the strength ratio of the fluorescent image actually taken based on the selected excitation wavelength and the fluorescent strength ratio by the change in such state No. 1 and state No. 2 as well as the case of the third embodiment.

Therefore, according to this embodiment, since the function of the excitation filter is included in the wavelength shift filter, the dye can be identified with smaller number of pieces of the filter and the device can be cheaper compared with the configuration shown in FIG. 1.

(Fifth Embodiment)

Hereinafter, a fifth embodiment when the present invention is applied to reflected light fluorescent microscope will be explained referring to the drawings.

Figure 10:
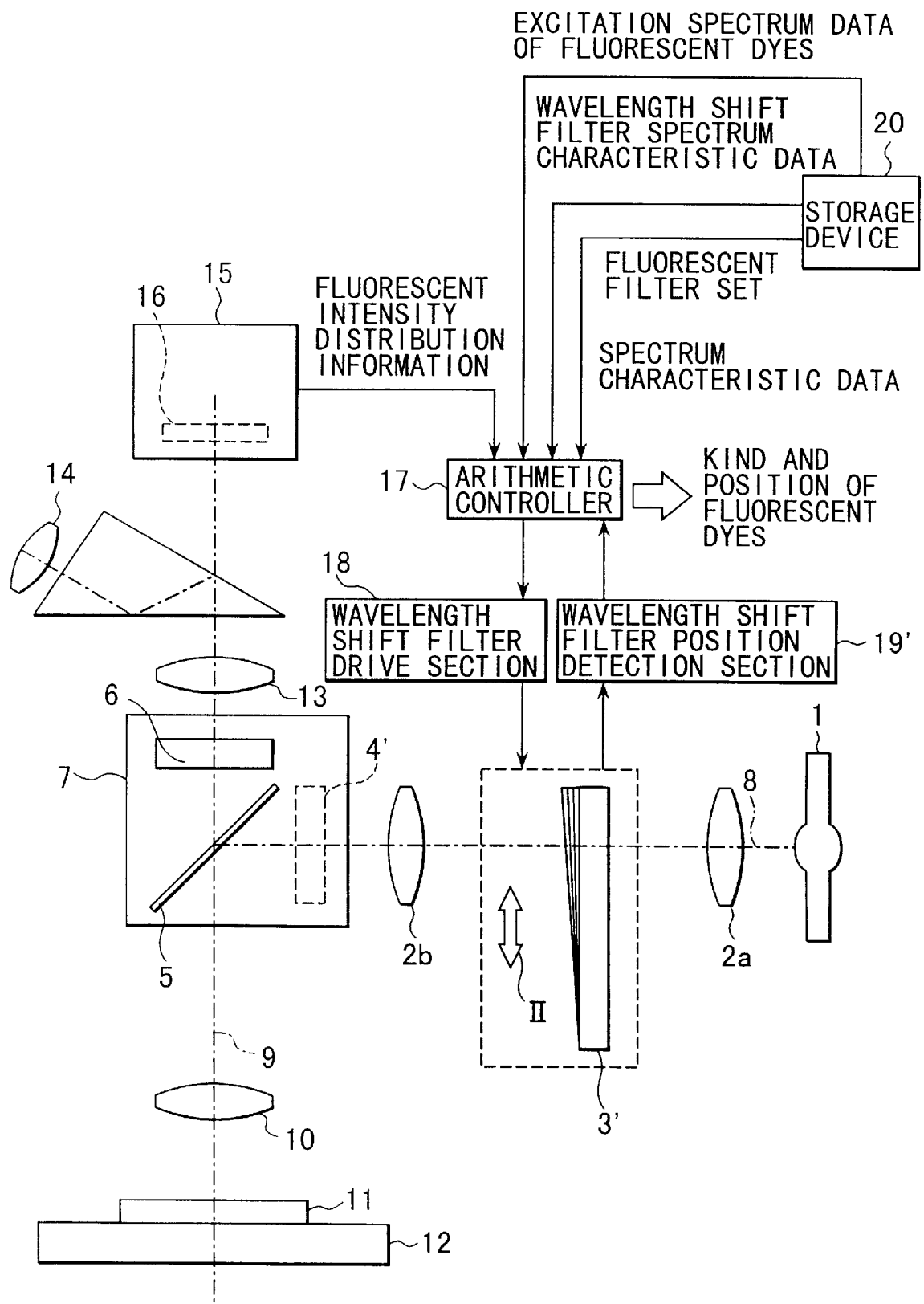
FIG. 10 is a figure which shows the schematic configuration of fluorescent microscope according to the fifth embodiment of the present invention.

FIG. 10 is a figure which shows the schematic configuration of a fluorescent microscope according to the fifth embodiment of the present invention, and since a basic configuration is similar to FIG. 1, the same mark is fixed to the same part and the explanation will be omitted.

An interference film filter, which changes the film thickness, continuously, but does not change the rotation position to illumination optical axis 8 as wavelength shift filter 3' is used. This interference film filter has the section having wedge shape, the film thickness thereof changes continuously, the length of the film of the interference light path is changed by moving it a vertical direction (direction of an arrow in the figure) to illumination optical axis 8 as shown by arrow II in the figure, and the transmitting wavelength band is shifted.

As well as the case of the fourth embodiment, the interference film filter, which constructs wavelength shift filter 3', has function of excitation filter 4 of fluorescent filter set 7, and the configuration of excitation filter 4 is omitted.

Next, an operation of the fifth embodiment will be explained.

Here, specimen 11 is assumed to be dyed with three kinds of fluorescent dye s, that is, Blue (blue) excitation dye, Green (green) excitation dye and Red (red) excitation dye, and each of dichroic mirror 5 and barrier filter 6 is assumed to have three transmitting wavelength bands according to the fluorescent luminescence wavelength of the fluorescent dye. The interference film filter which constructs wavelength shift filter 3', is assumed to have narrow width of the wavelength as shown in FIG. 11A, and have only one high permeability transmission band.

Figures 11A, 11B:
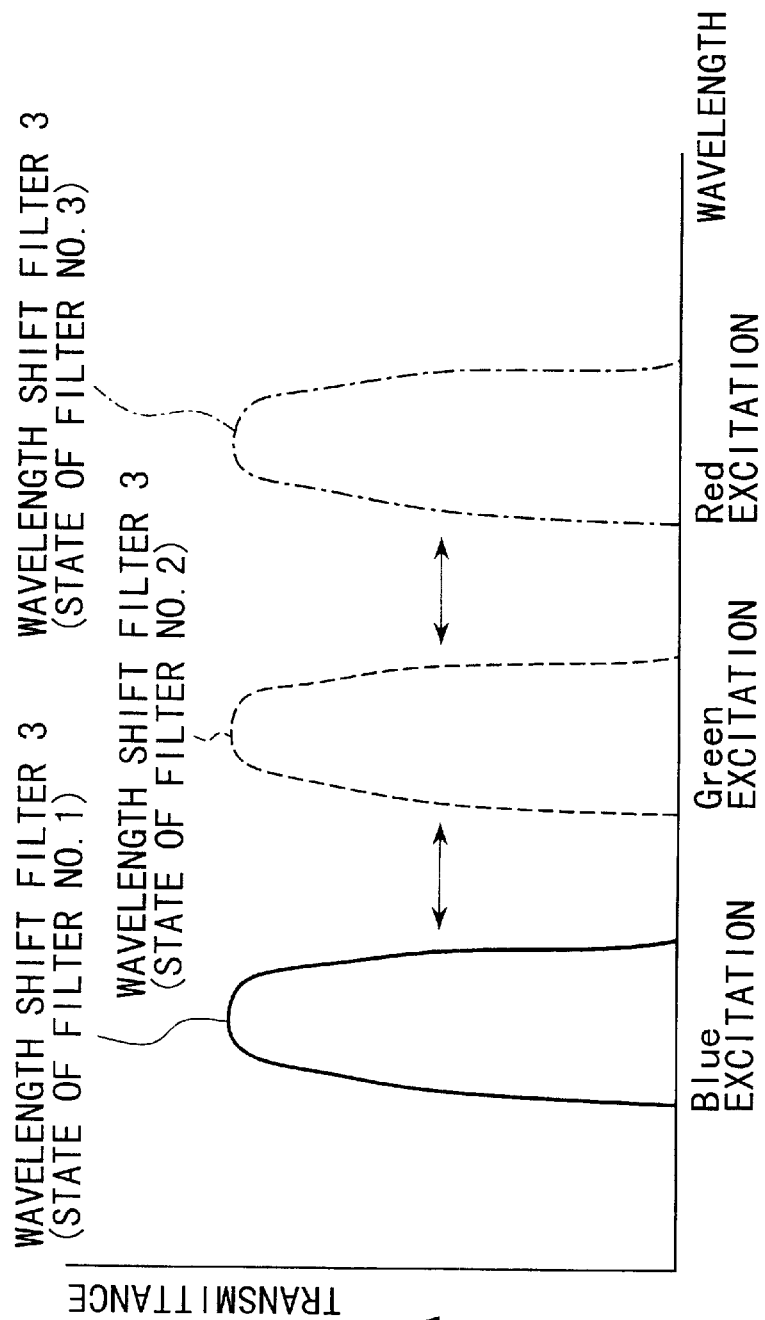
FIG. 11A and FIG. 11B are figures to explain the operation according to the fifth embodiment.

To be suitable wavelength for excitation spectrum of Blue excitation dye in state No. 1, Green excitation dye in state No. 2, and Red excitation dye in state No. 3 shown in FIG. 11A and FIG. 11B, respectively, the transmitting wavelength band of wavelength shift filter 3' is set, and the positioning mechanism such as the click (not shown) is installed in the direction of the moving direction of wavelength shift filter 3' to be changeable from these states of No. 1 to No. 3.

And, wavelength shift filter drive section 18 drives in the slide to change the position of wavelength shift filter 3', and the position is detected by position detection section 19'.

Since arithmetic controller 17 makes the position of the interference film filter, which constructs wavelength shift filter 3', change to the state No. 3 from the state No. 1, respectively, by wavelength shift filter drive section 18 to make only each fluorescent dye of Blue, Green, and Red excitation in specimen 11, the kinds and the positions of these three kinds of fluorescent dyes can be identified by performing the arithmetic processing to the obtained fluorescent intensity distribution, comparing it with data from memory device 20, and making judgment by arithmetic controller 17.

According to the embodiment, since wavelength shift filter 3', which is constructed by the interference film filter which changes the film thickness continuously, is used, and the setting of the degree in which the film thickness in the interference film filter changes can be arbitrarily set, the amount of the shift of the transmitting wavelength band can be set larger compared with the scheme in which interference filter is inclined to illumination optical axis 8, the number of pieces of the filter which constructs wavelength shift filter 3 (3') can be fewer, and the cost of device can be more decreased.

In this embodiment, in the above explanation, excitation filter 4' is not clearly described as a necessary component, but the configuration to which excitation filter 4' is provided, may be applied.

(Sixth embodiment)

Hereinafter, a sixth embodiment when the present invention is applied to reflected light fluorescent microscope will be explained referring to the drawings.

Figure 12:
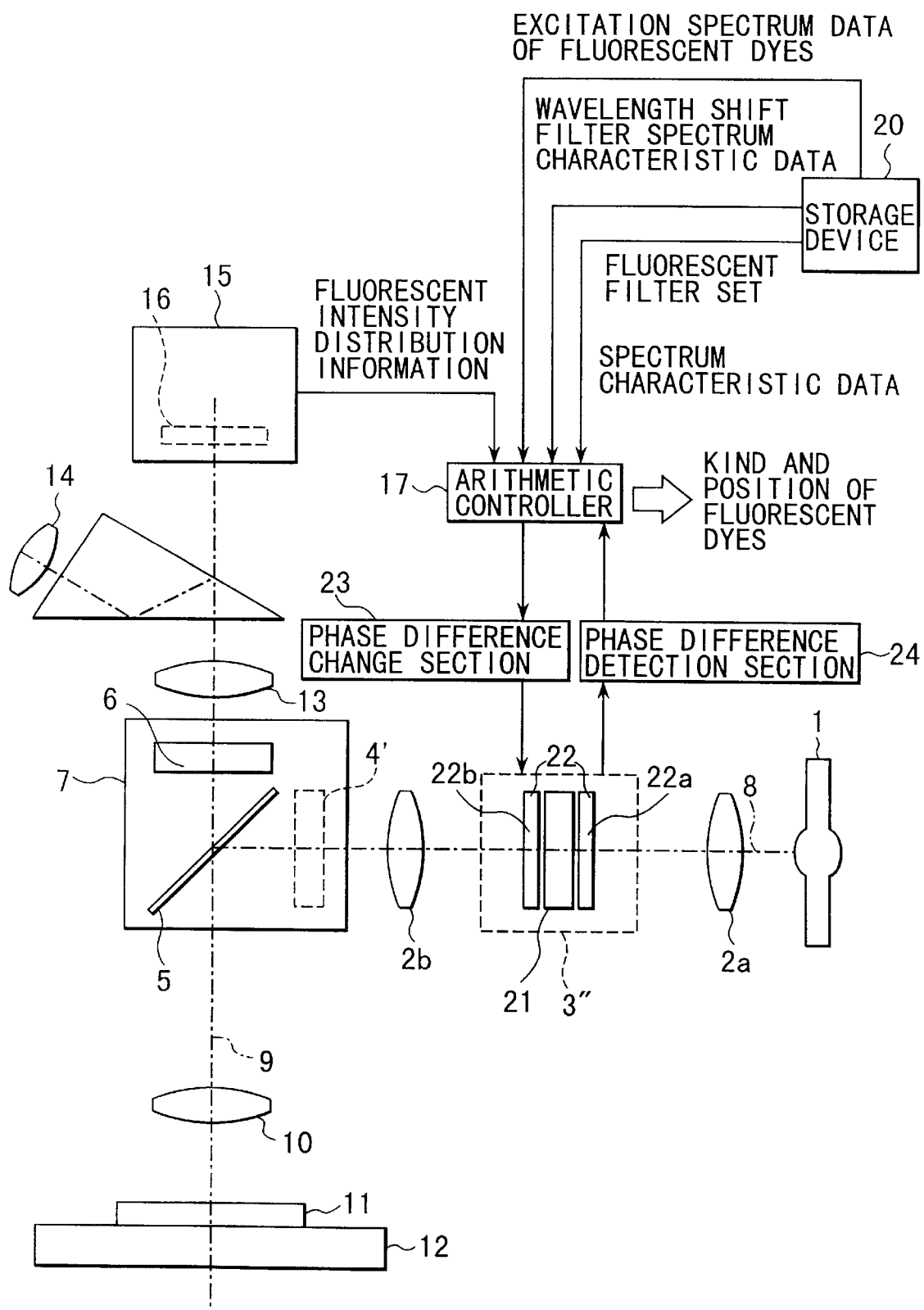
FIG. 12 is a figure which shows the schematic configuration of fluorescent microscope according to the sixth embodiment of the present invention.

FIG. 12 is a figure which shows the schematic configuration of a fluorescent microscope according to the fourth embodiment of the present invention, and since a basic configuration is similar to FIG. 1, the same mark is fixed to the same part and the explanation will be omitted.

In this embodiment, wavelength shift filter 3" does not change the rotation position to illumination optical axis 8 and has a pair of polarizing plates 22 sandwiching variable phase plate 21.

Variable phase plate 21 is constructed for example by the liquid crystal plate, the direction of the crystal axis of the liquid crystal material is changed by changing the applied voltage to shift only the phase in the direction of an optical axis, and the amount of the shift is variable.

Polarizing plate 22 is constructed by polarizer 22a on the light source 1 side and analyzer 22b on the fluorescent filter set 7 side, an optical axis of variable phase plate 21 and the deflection direction of polarizer 22a are arranged with a certain angle, and a linear polarized light which transmits polarizer 22a is rotated in deflection direction by variable phase plate 21 and becomes an ellipse polarized light.

Since the amount of the phase shift of variable phase plate 21 is different according to the wavelength, the rotation angle in the direction of the polarized light is also different. Therefore, only a specific wavelength band can be selectively transmitted by selectively transmitting the angle component with the polarized light which become a rotation angle different in this each wavelength by analyzer 22b.

Wavelength shift filter 3" shifts the transmitting wavelength band by using this principle since this selected wavelength is different by changing and setting the amount of the phase shift of variable phase plate 21. A detailed principle is described in "TUNABLE COLOR FILTER", U.S. Pat. NO. 5,689,317.

Phase difference change section 23 is arranged in place of wavelength shift filter drive section 18, and phase difference detection section 24 is arranged in place of angle detection section 19, respectively, then the change operation of the transmitting wavelength band and the detection operation of the phase difference are performed.

As well as the case of the fourth and the fifth embodiments, the interference film filter, which constructs wavelength shift filter 3", has function of excitation filter 4 of fluorescent filter set 7, and the configuration of excitation filter 4 is omitted.

Next, an operation of the sixth embodiment will be explained.

Here, specimen 11 is assumed to be dyed with three kinds of fluorescent dye s, that is, Blue (blue) excitation dye, Green (green) excitation dye and Red (red) excitation dye, and each of dichroic mirror 5 and barrier filter 6 is assumed to have three transmitting wavelength bands according to the fluorescent luminescence wavelength of the fluorescent dye. The interference film filter which constructs wavelength shift filter 3", is assumed to have narrow width of the wavelength as shown in FIG. 11A, and have only one high permeability transmission band.

To be suitable wavelength for excitation spectrum of Blue excitation dye in state No. 1, Green excitation dye in state No. 2, and Red excitation dye in state No. 3 shown in FIG. 11A and FIG. 11B, respectively, the transmitting wavelength band of wavelength shift filter 3" is set by changing the amount of the phase shift by applying the voltage to the liquid crystal plate of variable phase plate 21.

Then, phase difference change section 23 changes the amount of the phase shift of wavelength shift filter 3" and the phase difference is detected by phase difference detection section 24 and sent to arithmetic controller 17.

Since arithmetic controller 17 makes the amount of the shift in wavelength shift filter 3", change to the state No. 3 from the state No. 1, respectively, by phase difference change section 23 to make only each fluorescent dye of Blue, Green, and Red excitation in specimen 11, the kinds and the positions of these three kinds of fluorescent dyes can be identified by performing the arithmetic processing to the obtained fluorescent intensity distribution, comparing it with data from memory device 20, and making judgment by arithmetic controller 17.

According to the embodiment, since the amount of the shift of the phase difference is changed and the transmitting wavelength band is shifted by changing the applied voltage to variable phase plate 21 which constructs wavelength shift filter 3", the shift operation of the transmitting wavelength band can be sped up, and the kind of and the position the dye can be identified in a short time. Fault is few since there is no mechanical movable section, and excellent durability can be achieved.

In this embodiment, in the above explanation, excitation filter 4' is not clearly described as a necessary component, but the configuration to which excitation filter 4' is provided, may be applied.

(Seventh Embodiment)

Hereinafter, a seventh embodiment when the present invention is applied to reflected light fluorescent microscope will be explained referring to the drawings.

Figure 13:
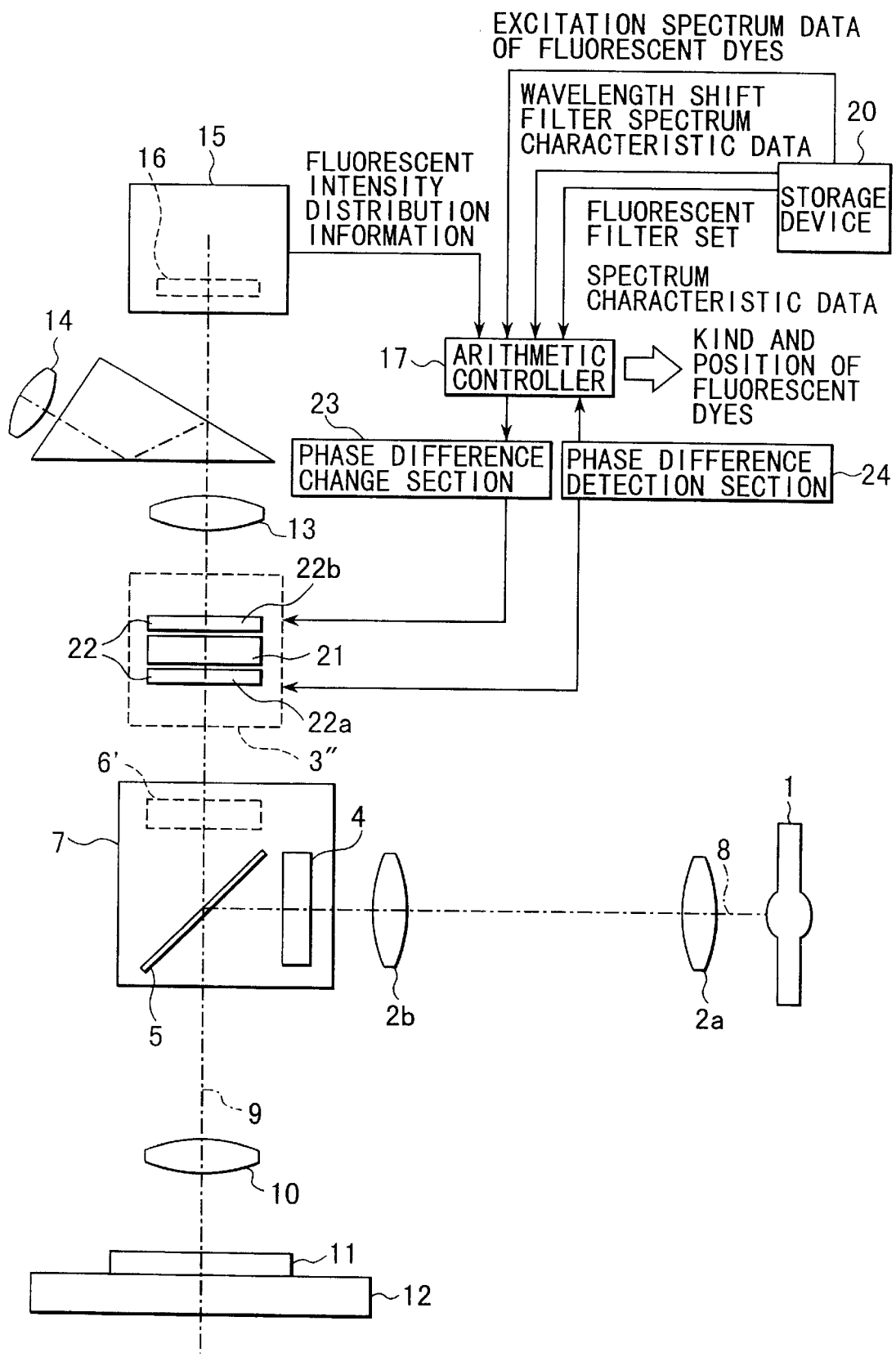
FIG. 13 is a figure which shows the schematic configuration of fluorescent microscope according to the seventh embodiment of the present invention.

FIG. 13 is a figure which shows the schematic configuration of a fluorescent microscope according to the fourth embodiment of the present invention, and since a basic configuration is similar to FIG. 12, the same mark is fixed to the same part and the explanation will be omitted.

Wavelength shift filter 3' is not arranged between illumination lenses 2a and 2b, but is arranged between fluorescent filter set 7 on observation optical axis 9 and image formation lens 13 as the barrier filter.

New excitation filter 4 is rearranged in fluorescent filter set 7.

Next, an operation of the seventh embodiment will be explained.

Here, specimen 11 is assumed to be dyed with three kinds of fluorescent dyes, that is, Blue (blue) excitation dye, Green (green) excitation dye and Red (red) excitation dye, and each of dichroic mirror 5 and barrier filter 6 is assumed to have three transmitting wavelength bands according to the fluorescent luminescence wavelength of the fluorescent dye. The interference film filter which constructs wavelength shift filter 311, is assumed to have narrow width of the wavelength as shown in FIG. 14A, and have only one high permeability transmission band.

Figure 14A:
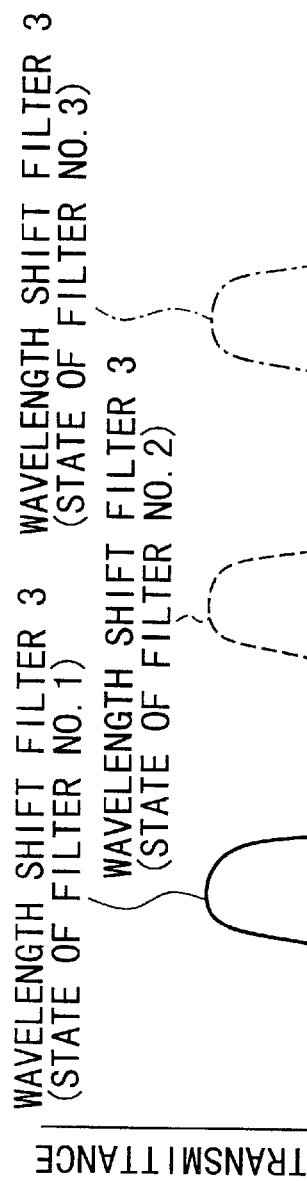
FIG. 14A and FIG. 14B are figures to explain the operation according to the seventh embodiment.
Figure 14B:
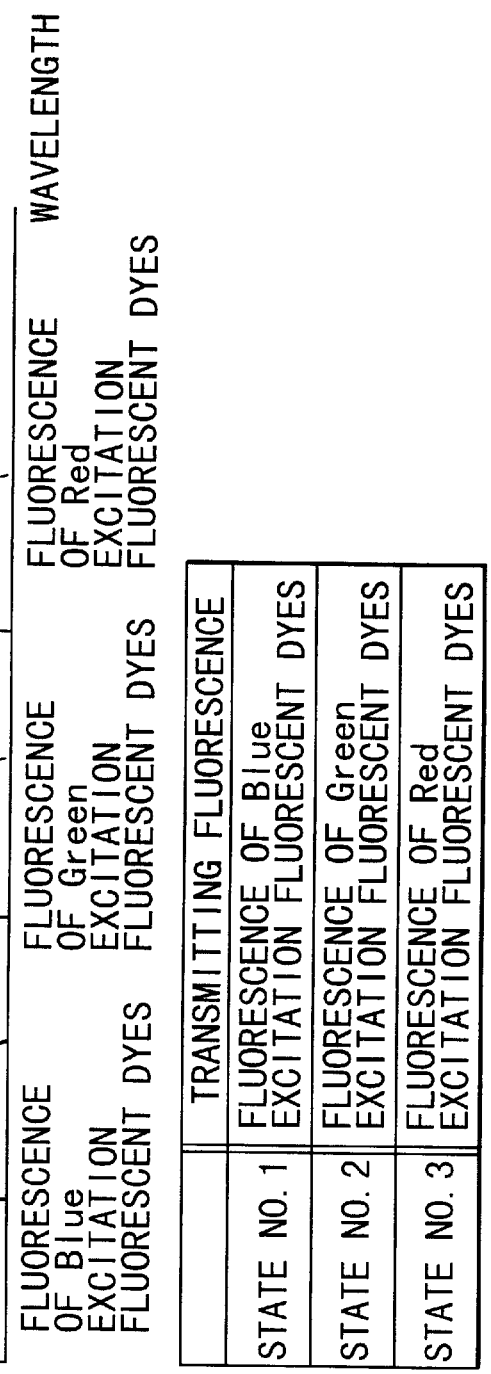

FIG. 14A and FIG. 14B shows the spectrum permeability graph of wavelength shift filter 3" in state No. 1 to state No. 3 and the fluorescence which transmits in each state. In wavelength shift filter 3", arithmetic controller 17 variably set the applied voltage to variable phase plate 21 by phase difference change section 23 and controls the amount of the phase difference shift, and transmits only the luminescence fluorescence of each fluorescent dye one by one as shown in state No. 1 to No. 3 by shifting the band of the transmitting wavelength in wavelength shift filter 3".

The kinds and the positions of these three kinds of fluorescent dyes can be identified by performing the arithmetic processing to the fluorescent intensity distribution obtained from imaging device 15 and judging compared with data from memory device 20 with arithmetic controller 17.

According to the embodiment, as well as the sixth embodiment, since the amount of the shift of phase difference is changed, and the wavelength band of luminescence fluorescence is selected and us transmitted, by changing the applied voltage of variable phase plate 21 which constructs wavelength shift filter 3" which is arranged as barrier filter, when a fluorescent wavelength of each dye is very near and overlaps the fluorescences of other dyes other than the fluorescence of the desired dye can be excluded, and the kind and the position of the fluorescent dye in specimen 11 can be identified more accurately by setting the transmitting wavelength band of wavelength shift filter 3" narrowly.

In this embodiment, in the above explanation, barrier filter 6' is not clearly described as a necessary component, but the configuration to which barrier filter 6' is provided, may be applied.

The present invention is not limited to the above-mentioned first to seventh embodiments. The present invention can be executed by any modifications within the range in the scope of the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A fluorescent microscope to observe a specimen dyed with a plurality of fluorescent dyes comprising:

an objective lens;

a first filter which selectively transmits light from a light source;

a dichroic mirror which leads said light transmitting said first filter to the specimen and transmits fluorescence from the specimen;

a second filter which selectively transmits said fluorescence from the specimen;

a changing section to change at least one transmitting wavelength band of said first filter and said second filter;

a detection section to detect the wavelength band selected by said changing section;

an imaging element which images an image of the specimen formed by said objective lens; and an identification section to identify a kind and the position of the fluorescent dyes with which the specimen is dyed based on said wavelength band obtained from said detection section before and after a change in said transmitting wavelength band by said wavelength band change section and a change in said image according to a change in said transmitting wavelength band.

2. The fluorescent microscope according to claim 1, wherein at least one of said first filter and said second filter has a plurality of filters.

3. The fluorescent microscope according to claim 2, wherein said first filter includes an excitation filter.

4. The fluorescent microscope according to claim 2, wherein said second filter includes a barrier filter.

5. The fluorescent microscope according to claim 1, wherein at least one of said first filter and said second filter includes an interference filter, and said changing section changes a transmitting wavelength band by rotating the interference filter around a rotation axis vertical to an optical axis.

6. The fluorescent microscope according to claim 5, wherein said first filter includes an excitation filter.

7. The fluorescent microscope according to claim 5, wherein said second filter includes a barrier filter.

8. The fluorescent microscope according to claim 1, wherein at least one of said first filter and said second filter includes an interference filter which continuously and variably sets a film thickness of a part inserted in an optical axis, and said changing section changes a transmitting wavelength band by vertically changing the film thickness of said interference filter to the optical axis.

9. The fluorescent microscope according to claim 8, wherein said first filter includes an excitation filter.

10. The fluorescent microscope according to claim 8, wherein said second filter includes a barrier filter.

11. The fluorescent microscope according to claim 1, wherein
at least one of said first filter and said second filter has a polarizing plate and a variable phase plate in which a phase difference is variable, and
said changing section changes a transmitting wavelength band by changing a phase of said variable phase plate.

12. The fluorescent microscope according to claim 11, wherein said first filter includes an excitation filter.

13. The fluorescent microscope according to claim 11, wherein said second filter includes a barrier filter.

14. The fluorescent microscope according to claim 5, wherein said interference filter includes a plurality of interference filters arranged in series with the optical axis.

15. The fluorescent microscope according to claim 14, wherein said first filter includes an excitation filter.

16. The fluorescent microscope according to claim 5, wherein said interference filter includes a plurality of interference filters, and said plurality of interference filters are switched and used respectively.

17. The fluorescent microscope according to claim 16, wherein said first filter includes an excitation filter.

18. A fluorescent microscope to observe a specimen dyed with a plurality of fluorescent dyes, comprising:
a first filter which selectively transmits light from a light source;
a dichroic mirror which leads a light transmitting said first filter to the specimen and transmits fluorescence from the specimen;
a second filter which selectively transmits fluorescence from the specimen;
a changing section to change at least one transmitting wavelength band of said first filter and said second filter;
a detection section to detect the wavelength selected by said changing section;
an imaging element which images an image of the specimen; and
an identification section to identify a kind and the position of the fluorescent dyes with which the specimen is dyed based on wavelength data obtained from said detection section before and after a change in said transmitting wavelength band by said wavelength change section and a change in said transmitting wavelength band, wherein
at least one of said first filter and said second filter has a polarizing plate and a variable phase plate in which a phase difference is variable, and
said change section changes a transmitting wavelength band by changing a phase of said variable phase plate.

19. The fluorescent microscope according to claim 18, wherein said first filter includes an excitation filter.

20. The fluorescent microscope according to claim 18, wherein said second filter includes a barrier filter.

* * * * *